United States Patent [19]

Georget

[11] Patent Number: 5,019,018

[45] Date of Patent: May 28, 1991

[54] DEVICE FOR TENSIONING A POWER TRANSMISSION BELT

[75] Inventor: Pierre Georget, Chambray les Tours, France

[73] Assignee: Hutchinson, Paris, France

[21] Appl. No.: 483,409

[22] Filed: Feb. 22, 1990

[30] Foreign Application Priority Data

Mar. 6, 1989 [FR] France ............... 89 02888

[51] Int. Cl.⁵ ............................... F16H 7/10
[52] U.S. Cl. ......................... 474/117; 267/148
[58] Field of Search .............. 474/100, 101, 109–115, 474/117, 133–136, 138

[56] References Cited

U.S. PATENT DOCUMENTS

| | | | |
|---|---|---|---|
| 3,113,467 | 12/1963 | McKenna | 474/138 |
| 4,149,427 | 4/1979 | Ledvina | 474/100 |
| 4,422,627 | 12/1983 | Schmidt et al. | 267/148 |
| 4,504,254 | 3/1985 | Foster | 474/133 |
| 4,525,152 | 6/1985 | Speer et al. | 474/133 |
| 4,557,709 | 12/1985 | St. John | 474/117 |
| 4,571,223 | 2/1986 | Molloy | 474/133 |
| 4,661,087 | 4/1987 | Henderson | 474/135 |
| 4,886,483 | 12/1989 | Henderson | 474/135 |

Primary Examiner—Stephen J. Novosad
Attorney, Agent, or Firm—Bell, Seltzer, Park & Gibson

[57] ABSTRACT

A device for tensioning a power transmission belt which passes over a pulley. The pulley is supported by an arm and by a rotary part which has one end of an elastically-deformable element fixed thereto, the element being wound around the part and having its other end fixed to a fixed point. The element is constituted by a length of flat belt comprising a layer of cord embedded in a strip of elastomer material. The invention is particularly applicable to the car industry and to the domestic appliance industry.

10 Claims, 2 Drawing Sheets

DEVICE FOR TENSIONING A POWER TRANSMISSION BELT

The invention relates to a device for tensioning a power transmission belt, and intended, in particular, for use in the car industry and in the household appliance industry.

BACKGROUND OF THE INVENTION

In conventional manner, power transmission belts are tensioned by using devices having tension springs which are attached to a fixed point and to the shaft of a pulley or wheel over which the belt passes. These spring devices suffer from the drawback of having their own resonant frequencies and also of being subject to fatigue, to corrosion, and to temperature variations. In addition, it is often necessary to associate them with means for damping oscillating motion and vibration, thereby increasing their cost.

Proposals have also been made to use hydraulic devices for putting power transmission belts under tension, but these devices are relatively expensive.

The object of the present invention is to provide a device for tensioning a transmission belt, which device is simple, effective, cheap, and possesses its own oscillating motion and vibration damping qualities.

SUMMARY OF THE INVENTION

To this end, the present invention provides a device comprising an elastically-deformable element which is mounted between a fixed point and the shaft of a pulley over which the belt passes, and which is arranged to put the belt under tension when it is itself under tension, wherein the elastically-deformable element comprises a layer of cords having a low modulus of extension and embedded in a strip of elastomer type material.

In a preferred embodiment of the invention, the elastically-deformable element is constituted by a length of flat transmission belt, or by a closed loop of flat belt.

The device of the invention is particularly simple and cheap since it relies on using an elastically-deformable element which is of substantially the same constitution as a flat transmission belt, comprising a layer of cords embedded in a strip of elastomer material. This element can be made without difficulty to have the desired characteristics of stiffness and elongation capacity by using transmission belt manufacturing technology. In addition, the force-elongation characteristics of such an element have a degree of hysteresis, thereby providing sufficient damping of oscillating motion and vibration.

The above-mentioned elastically-deformable element may be wound on itself.

When the slack to be taken up in the belt is relatively large, it is thus possible to retain an acceptable elongation ratio for the elastically-deformable element.

Thin strips or sheets of material having a determined coefficient of friction may be interposed between superposed thicknesses of the elastically-deformable element.

The various turns of the elastically-deformable element can thus move relative to one another with predetermined friction, which friction may either be low or else relatively large, depending on the application of the tensioning device.

In one embodiment of the invention, the elastically-deformable element is wound on a cylindrical part which is rotatable, with one end of the elastically-deformable element being fixed to the cylindrical part which is itself connected to the shaft of a pulley by a lever arm, while the other end of the elastically-deformable element is connected to a fixed point. In another embodiment, the elastically-deformable element is wound on a fixed device to which it is fixed via one end, whereas its other end is connected to the shaft of a pulley by means of a part which is moveable in translation.

It is thus possible to provide a rotary type of device or a device for motion in translation.

Finally, in all cases, an abutment may be provided for limiting the stroke of the moving part of the device in order to avoid fully relaxing the elastically-deformable element.

This makes it possible to conserve a predetermined tension force.

BRIEF DESCRIPTION OF THE DRAWINGS

Embodiments of the invention are described by way of example with reference to the accompanying drawings, in which.

DETAILED DESCRIPTION

Figure 1:
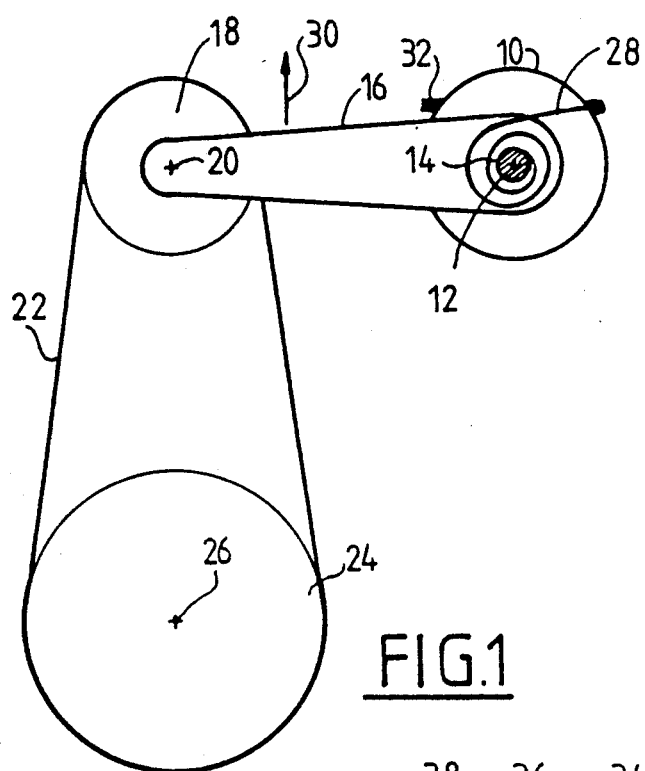
FIG. 1 is a diagrammatic view of a belt tensioning device of the invention.

Reference is madae initially to FIG. 1 which is a diagram showing an application of a belt tensioning device of the invention.

The device is essentially constituted by a fixed base 10 having a substantially cylindrical part 14 mounted thereon to rotate about an axis 12, the cylindrical part 14 being fixed to a lever arm 16 which carries a pulley 18 whose axis of rotation 20 is parallel to the axis of the cylindrical part 14.

A belt 22 passes over the pulley 18 and over at least one other pulley 24 having its axis 26 parallel to the above-mentioned axes 12 and 20.

The tensioning device of the invention also includes an elastically-deformable element 28 having one end fixed to the part 14 and wound around said part (clockwise in the FIGURE) with its other end being fixed to the above-mentioned base 10. When the elastically-deformable element 28 is put under tension, it exerts a return force on the lever arm 16 in the direction of arrow 30. An abutment 32 is mounted, e.g. adjustably, on the base 10 in order to limit the rotation of the arm 16 in a clockwise direction, thereby preventing the elastically-deformable element 28 relaxing completely and thus conserving a predetermined value of tension applied to the belt 22.

Figure 3:
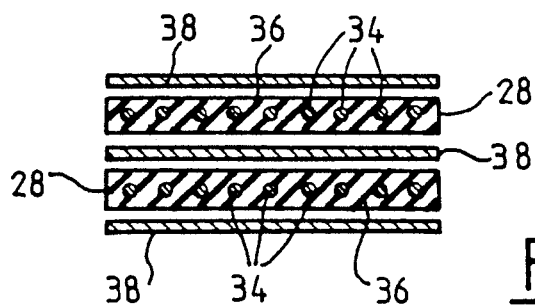
FIG. 3 is a diagrammatic section on a larger scale showing the disposition of the elastically-deformable element and of the sheets of substance having a determined coefficient of friction.

According to the invention, the elastically-deformable element 28 is constituted, as shown by way of example in FIG. 3, by a layer of cords 34 embedded in a strip 36 of elastomer material, e.g. rubber.

The cords 34 are selected and designed so as to have a low modulus of extension, i.e. a relatively small change in their elongation does not significantly change the traction exerted on the arm 16.

For example, the cords 34 may be made of 940 decitex nylon threads which are twisted together and bonded together, e.g. of the 940×2 or the 940×4×2 type, as commonly used in manufacturing flat transmission belts, with the layer of cords 34 being embedded in a strip of elastomer 36 whose sole function is to hold the cords 34 together.

Conventional belt manufacturing techniques make it possible to obtain a uniform layer of cords 34 and thus a uniform elastically-deformable element 28.

Figure 4:
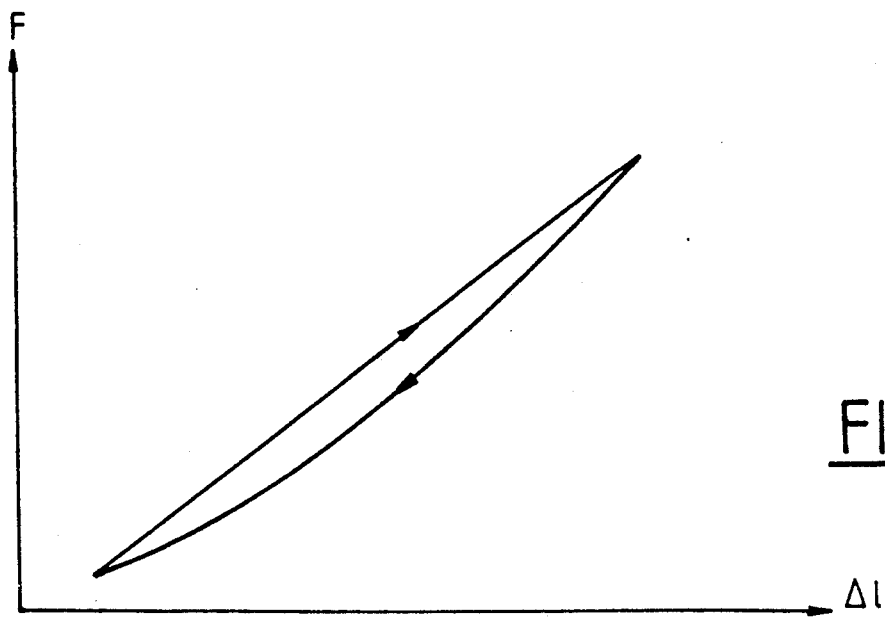
FIG. 4 is a graph showing the tension-elongation characteristic of an elastically-deformable element of the invention.

FIG. 4 is a force-elongation graph of an elastically deformable element 28 of the invention, showing that the curve of tension as a function of elongation presents a small amount of hysteresis, said hysteresis nevertheless sufficing to damp the major portion of oscillating motion and vibration applied to the arm 16 of the tensioning device in operation.

The length of the elastically-deformable element 28 is determined in such a manner that its elongation per unit length retains an acceptable value.

In order to reduce interfering effects due to friction of the element 28 on itself when wound on the cylindrical part 14, a layer, sheet, or film 38 of material having determined friction characteristics such as "Teflon" (polytetrafluoroethylene) is applied on at least one face of said element when it is desired to ensure that the various turns of the element 28 slide properly over one another. It would also be possible to use a different material, having a higher coefficient of friction, should it be desired to increase damping.

Figure 2:
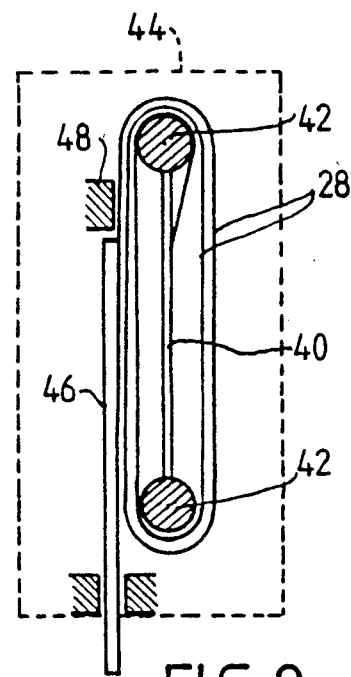
FIG. 2 is a diagram showing a variant of this device.

FIG. 2 shows a variant embodiment of the device of the invention which is of the linear type.

In this FIGURE, the elasticallty-deformable element 28 is fixed at one end to a fixed rod or plate 40 and it is wound like a hank over two rods 42 fixed to a base 44. The other end of the elastically-deformable element 28 is fixed to a bar 46 which is guided in translation over the base 44 and which is connected in a manner not shown to the shaft of a pulley over which a belt passes. An abutment 48 mounted on the base 44 cooperates with one end of the bar 46 in order to prevent the elastically-deformable element 4, relaxing completely.

This device operates in the same way as that shown in FIG. 1, with the only difference being that the elastically deformable element 28 exerts a substantially rectilinear traction force on the bar 46, whereas in the FIG. 1 device it exerts a return torque on the arm 16.

Figure 5:
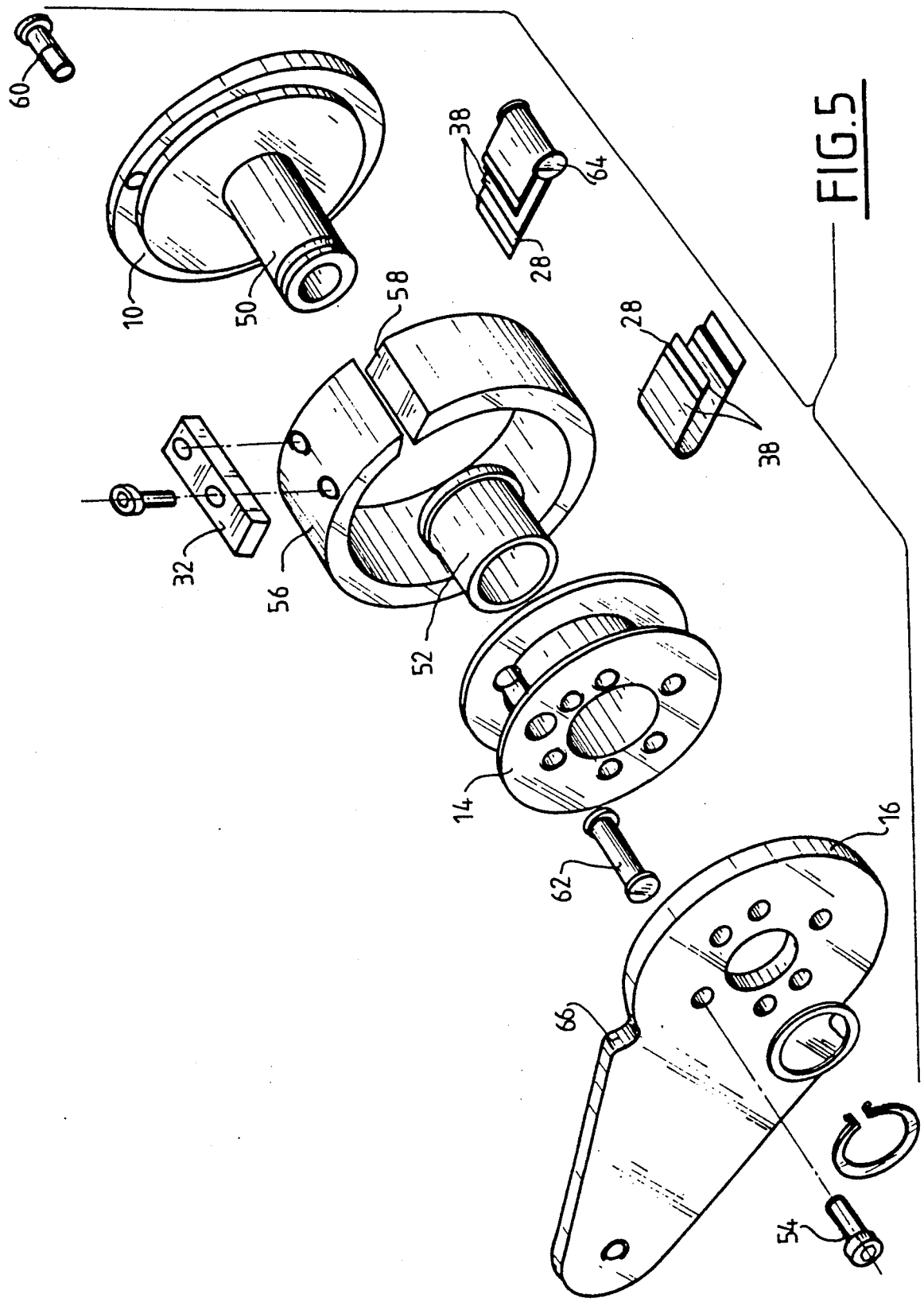
FIG. 5 is an exploded perspective view of an embodiment of a device of the invention.

A practical embodiment of the FIG. 1 device is shown by way of example in FIG. 5.

This figure shows the base 10 to which a cylindrical shaft 50 is fixed, the shaft having the cylindrical reel-shaped part 14 rotatably mounted thereon via a self-lubricating bearing 52. Screws 54 enable the arm 16 to be fixed on one of the faces of the reel 14, and a tubular part 56 including an oblique slot 58 and having a diameter greater than that of the reel 14 is fixed on the base 10 by means of a screw 60 so as to surround the reel 14 coaxially. One end of the elastically-deformable element 28 provided with layers or strips 38 of substance having a determined coefficient of friction is fixed to the reel 14 by means of a retaining pin 62 passing through the side pieces of the reel. Similarly, the other end of the elastically-deformable element 28 passes through the slot 58 in the tubular element 56 and is wound on a retaining pin 64 which forms abutment means and retaining means, bearing agains the outside edge of the slot 58.

In this embodiment, the elastically-deformable element 28 is an endless or closed loop flat belt having the desired tension-elongation characteristics and which is flattened onto itself.

The adjustable abutment 32 is constituted by a strip screwed onto the periphery of the annular element 56 and projecting over the arm 16 whose corresponding edge includes a notch 66 for receiving the abutment 32.

It will be understood that the tensioning device of the invention is cheap, since it is essentially constituted by a simple assembly that is moveable in rotation or in translation, including an elastically-deformable element constituted by a flat belt or a length of flat belt having a low modulus of extension. Tensioning devices can be made in various different shapes, since the elastically-deformable element is well suited for being wound onto itself.

I claim:

1. A device for tensioning a power transmission belt, the device comprising an elastically-deformable element which is mounted between a fixed point and the shaft of a pulley over which the belt passes, and which is arranged to put the belt under tension when it is itself under tension, wherein the elastically-deformable element comprises a layer of cords having a low modulus of extension and embedded in a strip of elastomer type material.

2. A device according to claim 1, wherein the elastically-deformable element is constituted by a length of flat transmission belt.

3. A device according to claim 1, wherein the elastically-deformable element is wound on itself.

4. A device according to claim 3, wherein thin strips of material having a determined coefficient of friction are interposed between superposed thicknesses of the elastically--deformable element.

5. A device accordiing to claim 1, wherein the elastically-deformable element is wound on a cylindrical part which is rotatable, and has one end fixed thereto, and which is itself connected to the shaft of a pulley by a lever arm, while the other end of the elastically-deformable element is connected to a fixed point.

6. A device according to claim 1, wherein the elastically-deformable element is wound on a fixed device to which it is fixed via one end, whereas its other end is connected to the shaft of a pulley by means of a part which is moveable in translation.

7. A device according to claim 5, including an abutment limiting the stroke of the moving part in the direction corresponding to the elastically deformable element relaxing.

8. A device according to claim 6, including an abutment limiting the stroke of the moving part in the direction corresponding to the elastically deformable element relaxing.

9. A device according to claim 1, wherein the elastically-deformable element is constituted by a closed loop of flat belt.

10. A device according to claim 3, wherein thin sheets of material having a determined coefficient of friction are imposed between superposed thicknesses of the elastically-deformable element.

* * * * *